United States Patent
Zhao

(10) Patent No.: US 7,792,837 B1
(45) Date of Patent: Sep. 7, 2010

(54) ENTITY NAME RECOGNITION

(75) Inventor: Shubin Zhao, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 354 days.

(21) Appl. No.: 11/940,177

(22) Filed: Nov. 14, 2007

(51) Int. Cl.
*G06F 17/30* (2006.01)

(52) U.S. Cl. ........................ 707/738; 707/709; 707/751; 707/803

(58) Field of Classification Search ........... 707/1, 707/3, 4, 6, 7, 10, 100, 104.1, 200, 204
See application file for complete search history.

(56) References Cited

U.S. PATENT DOCUMENTS 5,819,265 A * 10/1998 Ravin et al. .................... 707/5
7,197,449 B2 * 3/2007 Hu et al. ........................ 704/9

* cited by examiner

*Primary Examiner*—Cam-Linh Nguyen
(74) *Attorney, Agent, or Firm*—Morgan, Lewis & Bockius LLP

(57) ABSTRACT

A system, method, and computer program product for recognizing entity names from a plurality of documents. Embodiments of the methods comprise selecting a selection of documents from a plurality of documents, the selection of documents sharing a common pattern in their titles. The method further comprises determining a name candidate for each document in the selection by applying the common pattern to the title of the document, and matching the name candidates with a collection of entity names (the white list). Responsive to determining a match between the name candidates and the entity names in the white list, the method determines that the name candidates are valid entity names. In one embodiment, the name candidates are added to the white list after being determined to be valid entity names.

20 Claims, 8 Drawing Sheets

| Document ID | Document Title | Title Pattern | Name Candidate |
|---|---|---|---|
| D1 | CNN Programs – Anchors/Reporters – Larry King | %CNN Programs – Anchors/Reporters – % && %% | Larry King |
| D2 | CNN Programs – Anchors/Reporters – Jennifer Westhoven | %CNN Programs – Anchors/Reporters – % && %% | Jennifer Westhoven |
| D3 | CNN Programs – Anchors/Reporters – Bob Van Dillen | %CNN Programs – Anchors/Reporters – % && %% | Bob Van Dillen |
| D4 | SI.com – Tiger Woods Player Page | %SI.com – % && %Player Page% | Tiger Woods |
| D5 | SI.com – Jim Furyk Player Page | %SI.com – % && %Player Page% | Jim Furyk |
| D6 | CNN.com – Contact Us | %CNN.com – % && %% | Contact Us |
| D7 | CNN.com – Email Newsletters | %CNN.com – % && %% | Email Newsletters |

Example Format of Facts in Repository (each fact is associated with an object ID)

Example Facts in Repository (each fact is associated with an object ID)

Example Object Reference Table

Example Format of Facts in Repository (each fact is associated with an object ID)

Example Objects

| Document ID | Document Title | Title Pattern | Name Candidate |
|---|---|---|---|
| D1 | CNN Programs – Anchors/Reporters – Larry King | %CNN Programs – Anchors/Reporters – % && %% | Larry King |
| D2 | CNN Programs – Anchors/Reporters – Jennifer Westhoven | %CNN Programs – Anchors/Reporters – % && %% | Jennifer Westhoven |
| D3 | CNN Programs – Anchors/Reporters – Bob Van Dillen | %CNN Programs – Anchors/Reporters – % && %% | Bob Van Dillen |
| D4 | SI.com – Tiger Woods Player Page | %SI.com – % && %Player Page% | Tiger Woods |
| D5 | SI.com – Jim Furyk Player Page | %SI.com – % && %Player Page% | Jim Furyk |
| D6 | CNN.com – Contact Us | %CNN.com – % && %% | Contact Us |
| D7 | CNN.com – Email Newsletters | %CNN.com – % && %% | Email Newsletters |

*FIG. 4(a)*

| Name ID | Name |
|---|---|
| N1 | United States |
| N2 | Jennifer Westhoven |
| N3 | Tiger Woods |
| N4 | Google Inc. |
| N5 | Larry King |

*FIG. 4(b)*

| Name ID | Name |
|---|---|
| N1 | United States |
| N2 | Jennifer Westhoven |
| N3 | Tiger Woods |
| N4 | Google Inc. |
| N5 | Larry King |
| N6 | Bob Van Dillen |
| N7 | Jim Furyk |

ENTITY NAME RECOGNITION

CROSS-REFERENCE TO RELATED PATENT APPLICATIONS

This application is related to U.S. Utility patent application Ser. No. 11/394,610, entitled "Determining Document Subject by Using Title and Anchor Text of Related Documents," by Shubin Zhao, filed on Mar. 31, 2006, the disclosure of which is hereby incorporated by reference in its entirety.

TECHNICAL FIELD

The disclosed embodiments relate generally to fact databases. More particularly, the disclosed embodiments relate to recognizing entity names in document titles.

BACKGROUND

As computers and networks gain popularity, web-based computer documents ("documents") become a vast source of factual information. Users may look to these documents to get answers to factual questions, such as "what is the capital of Poland" or "what is the birth date of George Washington." The factual information included in these documents may be extracted and stored in a fact database.

It is beneficial to recognize entity names from these documents. These entity names can be used in organizing the factual information extracted from the documents. Because factual information is usually related to some entities, it can be organized to be associated with the names of these related entities. These entity names are also helpful in analyzing users' factual questions and identifying factual information necessary to answer them.

One conventional approach to recognizing entity names is to use human editors to review the documents. This approach is insufficient because the vast volume of documents and the rapid increase in the number of available documents make it impractical for human editors to perform the task on any meaningful scale.

Another conventional approach to recognizing entity names is to extract entity names from a reputable source, such as the Internet Movie Database. This approach is both under-inclusive and over-inclusive. Because the entity names are extracted from a single source, which tends to cover only certain types of entities (e.g., the Internet Movie Database only contains information about movies and people in the entertainment industry), the extracted entity names are only for a few types of entities. Therefore, this approach is under-inclusive. Because the extracted names may not be entity names (e.g., phrases extracted from entries for adjectives in the Merriam-Webster Online may not be entity names), this approach is also over-inclusive.

For these reasons, what is needed is a method and system for recognizing entity names.

SUMMARY

The above and other needs are met by methods, systems, and computer program products that recognize entity names. Embodiments of the methods comprise selecting a selection of documents from a plurality of documents, the selection of documents sharing a common pattern in their titles. The method further comprises determining a name candidate for each document in the selection by applying the common pattern to the title of the document, and matching the name candidates with a collection of entity names (also called the white list). Responsive to determining a match between the name candidates and the entity names in the white list, the method determines that the name candidates are valid entity names. In one embodiment, the name candidates are added to the white list after being determined to be valid entity names.

BRIEF DESCRIPTION OF THE DRAWINGS

FIGS. 4(a)-(c) illustrate an example process of the method illustrated in FIG. 3.

DESCRIPTION OF EMBODIMENTS

Embodiments are now described with reference to the figures where like reference numbers indicate identical or functionally similar elements.

System Architecture and Data Structure

Figure 1:
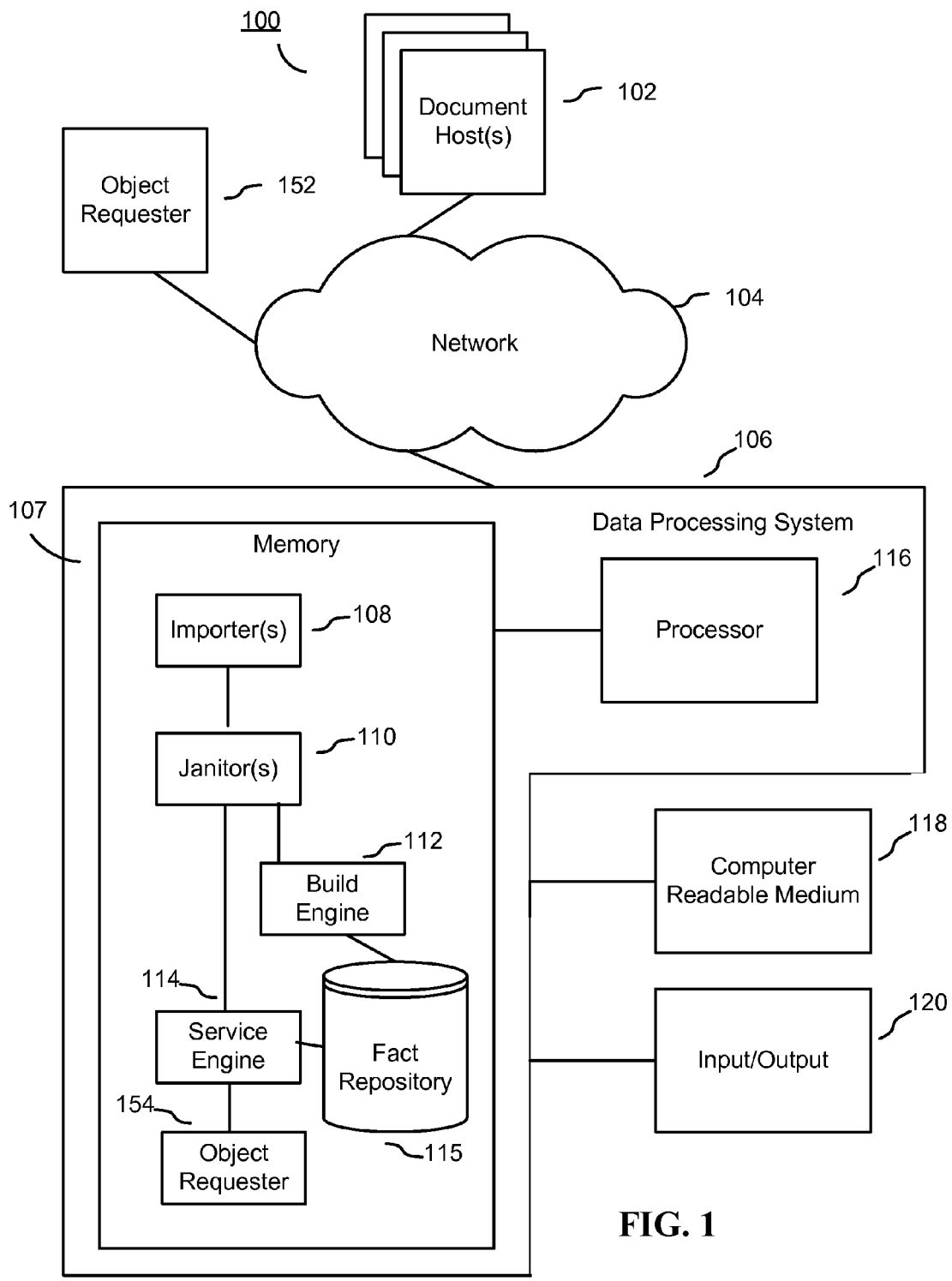
FIG. 1 shows a system architecture in accordance with one embodiment.

FIG. 1 shows a system architecture 100 adapted to support one embodiment. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. The facts describe entities, such as real-world or fictional people, places, or things.

A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. The data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by the processor 116. Importers 108 operate to process documents received from the document hosts, read the data content of documents, and extract facts (as operationally and programmatically defined within the data processing system 106) from such documents. The importers 108 also determine the subject or subjects (i.e., the entity or entities) with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as "Birthdate" by one janitor and then another janitor might notice that Dec. 2, 1981 and Dec. 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information about entities. The information is extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, the facts are logically organized into "objects," and each object contains a collection of facts associated with a single entity (i.e., real-world or fictional person, place, or thing). Each fact is associated with exactly one object. One implementation for this association includes in each fact an object ID that uniquely identifies the associated object. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(*a*)-2(*d*).

Some embodiments operate on the facts and/or objects in different orders than described above. For example, in one embodiment the importer 108 provides facts directly to the build engine 112 and/or repository 115. The janitors 110, in turn, operate on the facts and/or objects in the repository 115. It should also be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, the importer 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, a janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable storage medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

FIG. 2(*a*) shows an example format of a data structure for facts within the repository 115, according to some embodiments. As described above, the repository 115 includes facts 204 describing entities such as real-world and fictional people, places, and things. Each fact 204 includes a unique identifier for that fact, such as a fact ID 210. Each fact 204 includes at least an attribute 212 and a value 214. For example, a fact associated with the entity George Washington may include an attribute of "date of birth" and a value of "Feb. 22, 1732." In one embodiment, all facts are stored as alphanumeric characters since they are extracted from web pages.

In another embodiment, facts also can store binary data values. Other embodiments, however, may store fact values as mixed types, or in encoded formats.

As described above, each fact is associated with an object ID 209 that identifies the object with which the fact is associated. Thus, each fact that describes the same entity (such as George Washington), will have the same object ID 209. In one embodiment, the objects are logical concepts that exist as a collection of facts having the same object ID. In another embodiment, objects are stored as units of data in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2A:
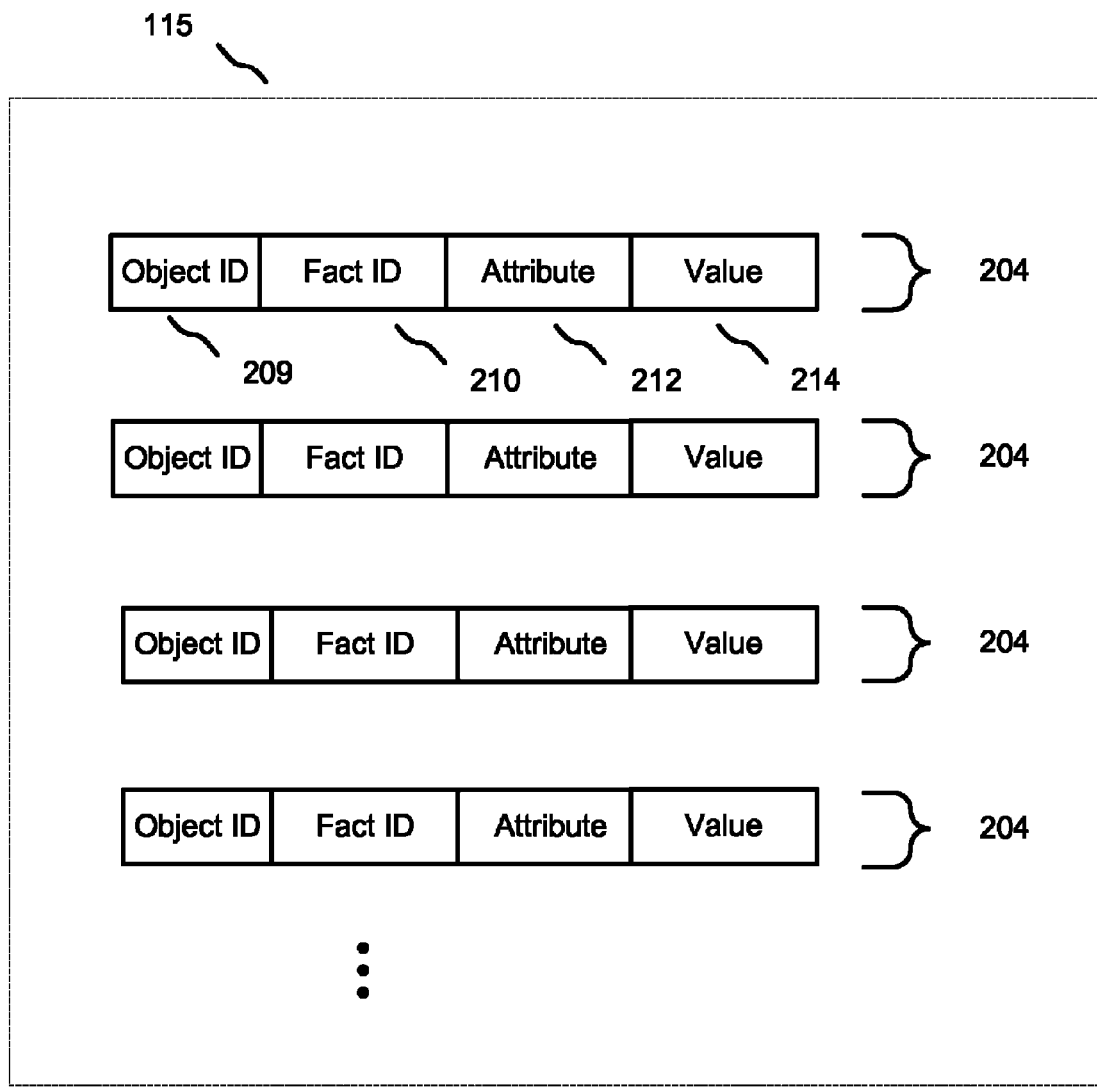
FIGS. 2(a)-2(d) are block diagrams illustrating embodiments of a data structure for facts within a repository of FIG. 1.
Figure 2B:
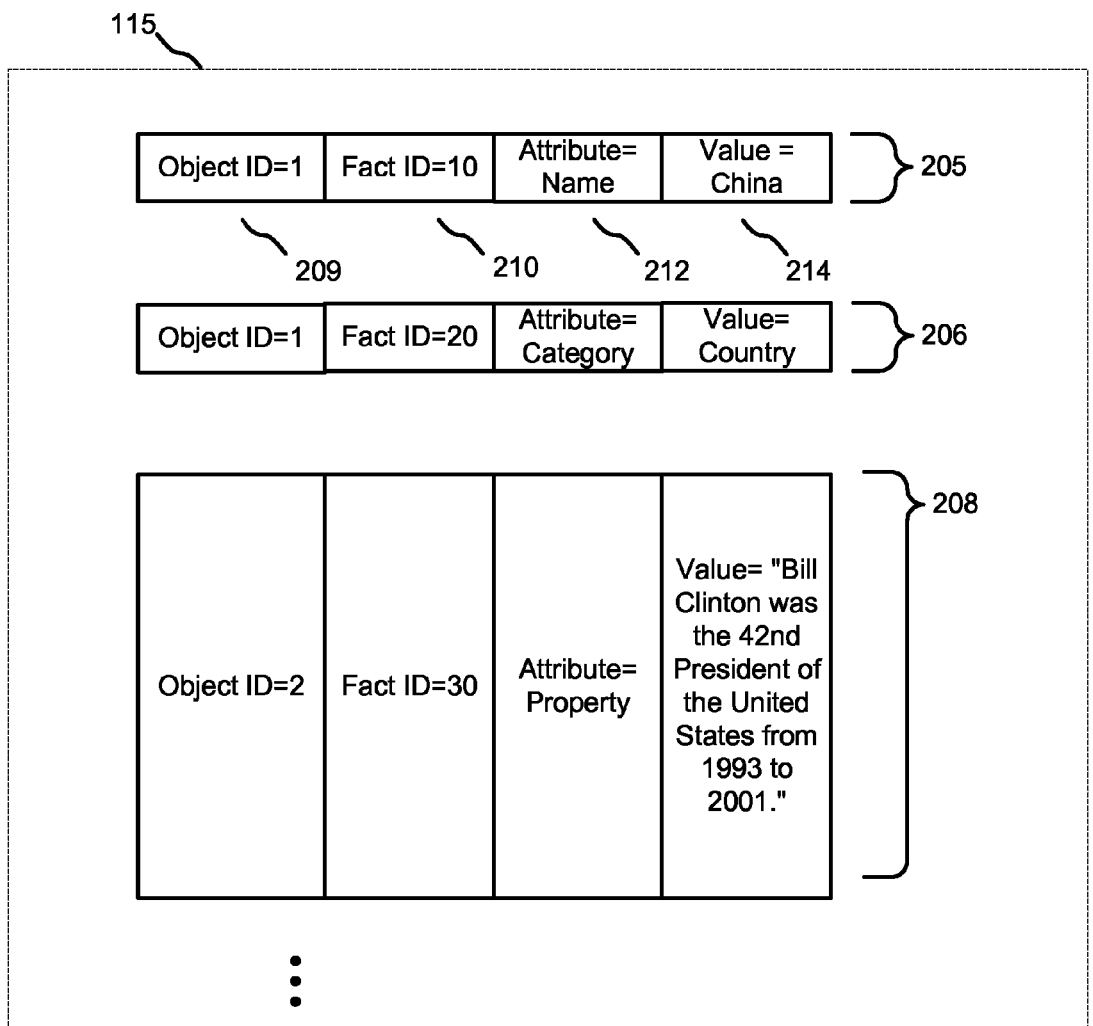

FIG. 2(b) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
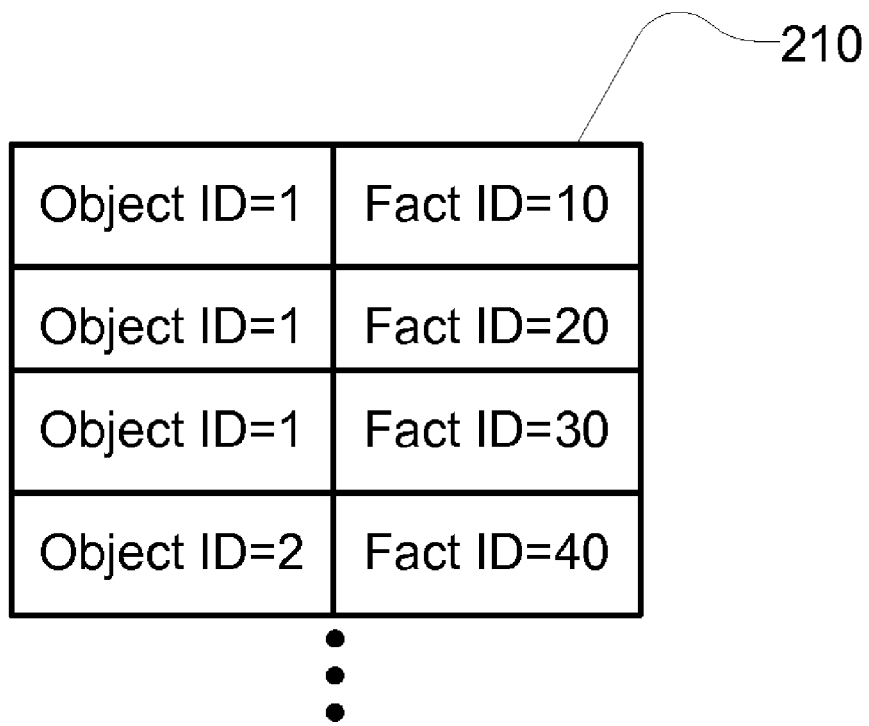

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
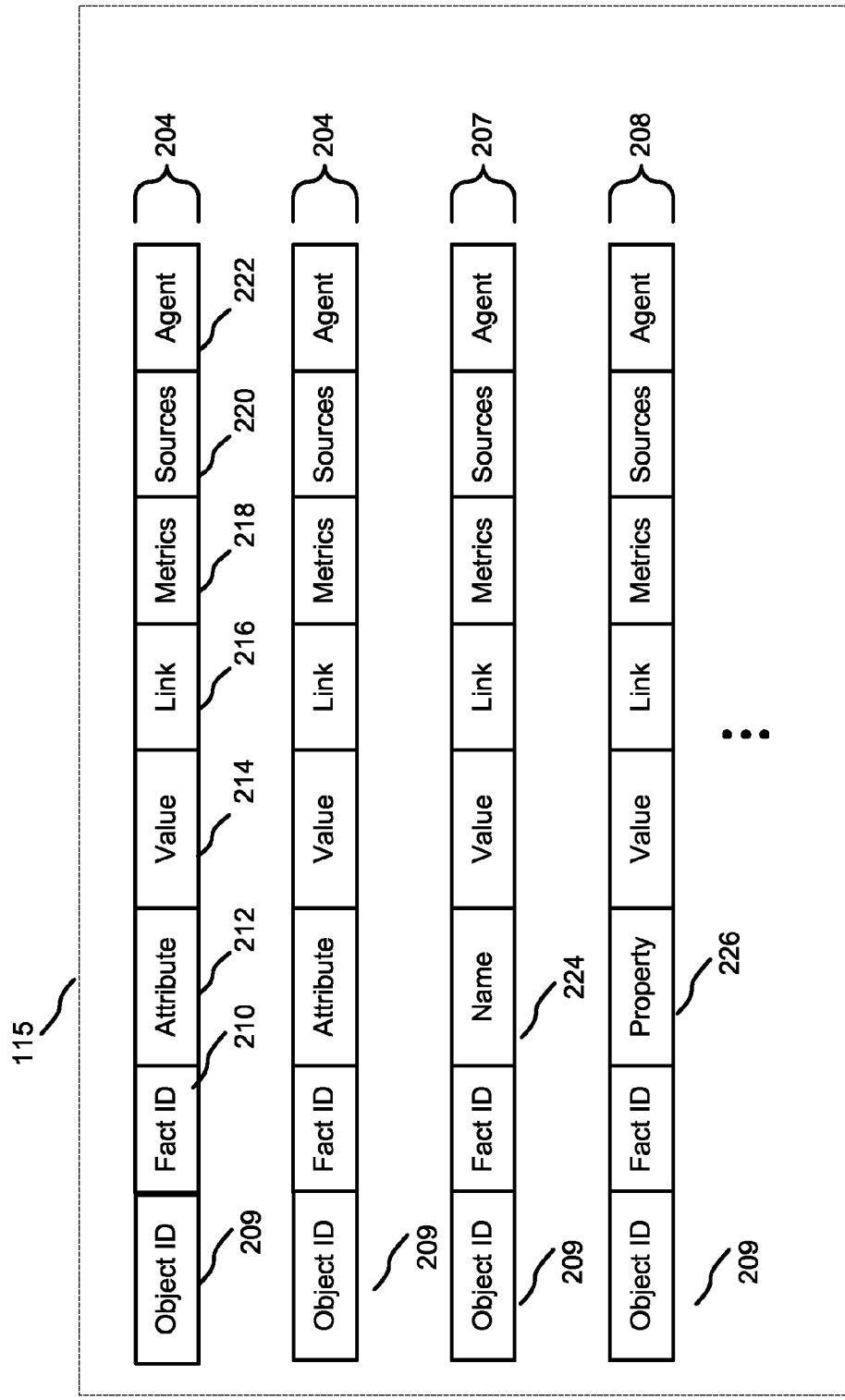

FIG. 2(d) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object associated with the entity "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush", and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity associated with the object.

Each fact 204 includes a list of one or more sources 220 that include the fact and from which the fact was extracted. Each source may be identified by a URL, or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity associated with the object in which the fact is included. A name fact 207 includes an attribute 224 of "name" and a value, which is the name of the associated entity. For example, for an object associated with country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object may have one or more associated name facts, as many entities can have more than one name. For example, an object associated with Spain may have associated name facts conveying the country's common name "Spain" and the official name "Kingdom of Spain." As another example, an object associated with the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly. The name facts associated with an object are also called synonymous names of the object.

A property fact 208 is a fact that conveys a statement about the entity associated with the object. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object associated with Bill Clinton, the value of a property fact may be the text string "Bill Clinton was the 42nd President of the United States from 1993 to 2001." Some objects may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity associated with the object. In some embodiments, an object's name(s) and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
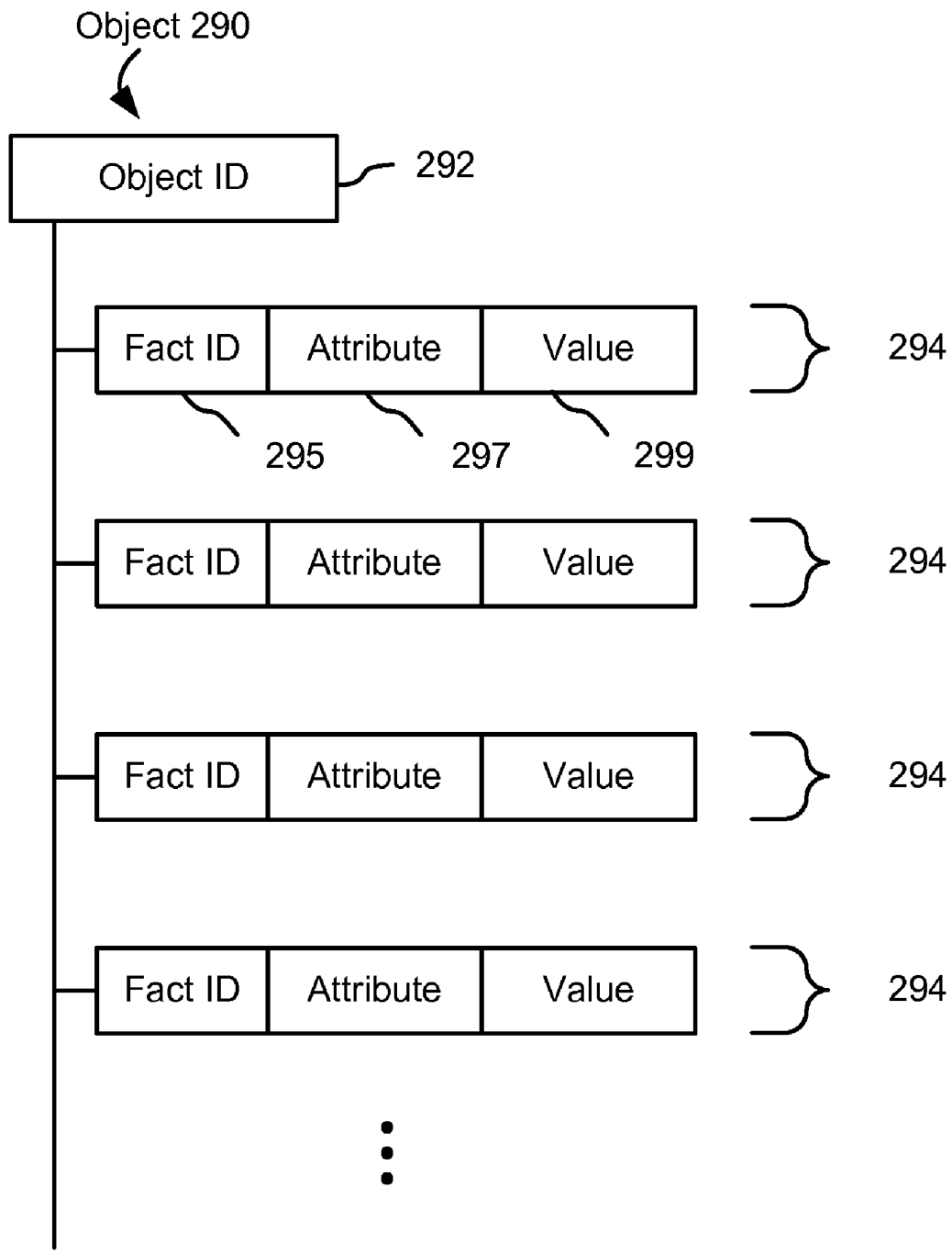
FIG. 2(e) is a block diagram illustrating an embodiment of an alternative data structure for facts and objects.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

As described above, an object may explicitly exist in the repository 115, or it may exist merely as a collection of facts with a common object ID. Reference is made to particular objects for the purposes of illustration; one of skill in the art will recognize that the systems and methods described herein are applicable to a variety of implementations and that such references are not limiting. When reference is made to a fact being associated with an object, it should be understood that in at least one embodiment a fact is associated with an object by sharing a common object ID with other facts. For example, a fact could be associated with an object of a given type by sharing a common object ID at least with a type fact indicating the given type (or as another example, with a category fact indicating a particular category of object). Furthermore, in various embodiments, facts and objects can be stored in a variety of structures, such as fact and/or object repositories. When reference is made herein to the repository 115, it should be understood that various embodiments may store facts and/or objects in a variety of data structures.

Overview of Methodology

Figure 3:
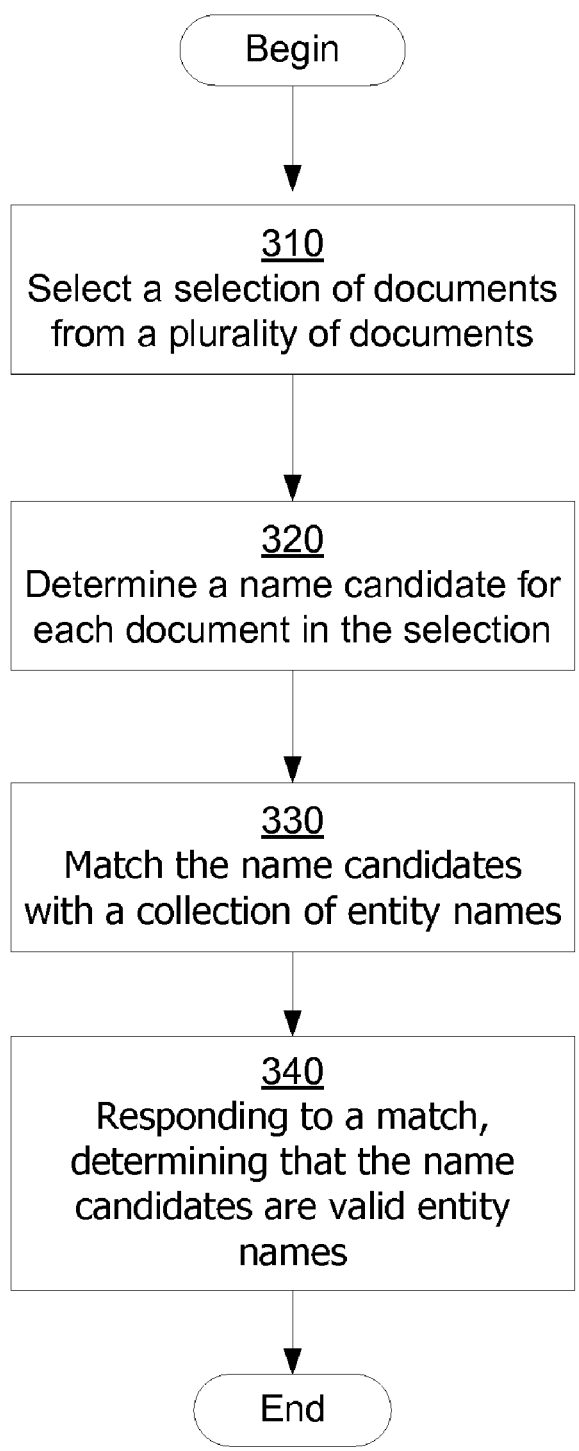
FIG. 3 is a flow diagram illustrating a method for recognizing entity names from a plurality of documents in accordance with one embodiment.

Referring now to FIG. 3, there is shown a flow diagram illustrating a method 300 for recognizing entity names from a plurality of documents in accordance with one embodiment. Other embodiments perform steps of the method 300 in different orders and/or perform different or additional steps than the ones shown in FIG. 3. The steps of the process illustrated in FIG. 3 may be implemented in software, hardware, or a combination of hardware and software.

In one embodiment, the steps of the method 300 may be performed by one or more importers 108 as shown in FIG. 1, although one skilled in the art will recognize that the method could be performed by systems having different architectures as well. The importers 108 can perform multiple instances of the steps of the method 300 concurrently and/or perform steps in parallel.

The flowchart shown in FIG. 3 will now be described in detail. The process commences with a plurality of documents, each of which has one or more titles. The plurality of documents may be retrieved from multiple domains (or network domains). A domain is a group of computers and devices on the Internet that are identified by a common Internet Protocol (IP) address. All documents from a computer or a device identified by the same IP address are from the same domain. Documents from the same domain may be stored in one or multiple document hosts 102.

The importer 108 selects 310 a selection of documents from among the plurality of documents. In one embodiment, the importer 108 compares titles of the plurality of documents, selects 310 those documents sharing a common pattern in their titles, and puts the selected documents into a same selection. A detailed description of selecting 310 a selection of documents sharing a common pattern in their titles can be found in U.S. patent application Ser. No. 11/394,610, entitled "Determining Document Subject by Using Title and Anchor Text of Related Documents," filed on Mar. 31, 2006, the disclosure of which is hereby incorporated by reference in its entirety.

In one embodiment, a common pattern comprises a common prefix section, a body section, and a common suffix section. A common pattern can be expressed as "%[COMMON PREFIX SECTION]% && %[COMMON SUFFIX SECTION]%," where "&&" represents the body section. For example, a common pattern shared by two titles "Summary for Microsoft CP-Yahoo! Finance" and "Summary for Yahoo Inc-Yahoo! Finance" is "% Summary for % && %-Yahoo! Finance %." In this example, the common prefix section is "Summary for" and the common suffix section is "-Yahoo! Finance." The contents of the body section of the two titles are "Microsoft CP" and "Yahoo Inc," respectively. The prefix section and/or the suffix section of a common pattern may be empty.

In one embodiment, the prefix and/or suffix sections may be dynamic prefix and/or suffix sections. For example, a dynamic suffix section of a common pattern may be "-mmm dd, yyyy," where "mmm" matches a three-character abbreviation of month, "dd" matches a two-digit day, and "yyyy" matches a four-digit year. "Sep. 2, 2007" and "Oct. 31, 2003" both match the dynamic suffix section even though they do not match each other character by character.

In one embodiment, the importer 108 determines that documents in the selection are from a same domain as well as share a common pattern in their titles. Documents from the same domain tend to share a consistent naming scheme. For example, all webpages in the "www.cnn.com" domain have a common prefix of "CNN." Therefore, by selecting documents sharing a common pattern in their titles and/or from a same domain, the importer 108 groups documents sharing a similar naming scheme into a same selection.

For each document in the selection, the importer 108 determines 320 a name candidate by applying the common pattern to the title of the document. The importer 108 identifies the content of the body section of the common pattern in the title of the document, and determines 320 the content to be the name candidate of the document.

Authors of documents tend to use the body section of the document titles to identify entities described in the documents. Because the documents in the selection share a common pattern, the common prefix and/or suffix in their titles tend to be used to identify (or describe) common attributes associated with the documents in the selection. For example, the common prefix and/or suffix may identify the source of the documents (e.g., publisher information) and the nature of the documents (e.g., financial report). Therefore, authors tend to use the portion of the title that is unique to each of the documents (content of the body section of the title) to identify the entity described in the document.

In one embodiment, the importer 108 applies normalization rules to the titles of the documents and/or the name candidates to standardize their formats. Examples of the normalization rules include removal of punctuation, such as removing commas in a string, conversion of uppercase characters in a string to corresponding lowercase characters, such as from "America" to "america," and stop word removal, such as removing stop words such as "the" and "of" from a string. For example, after applying the above normalization rules, a document title of "CNN Programs-Anchors/Reporters-Larry King" becomes "cnn programs anchorsreporters larry king."

In one embodiment, the importer 108 does not determine 320 name candidates for certain documents in the selection. For example, if the body section of a document title is empty or meaningless (e.g., stop words such as "the" or strings that are too short to reflect the subject of the document), the importer 108 can be configured not to determine 320 a name candidate for the document.

The importer 108 matches 330 the name candidates of the selection of documents with a collection of entity names (hereinafter called the "white list"). The white list contains valid entity names such as "United Nations" and "John Lennon" and can be compiled by human editors or extracted from reputable sources such as the Encyclopedia Britannica Online.

In one embodiment, the importer 108 determines that a name candidate matches with an entity name only when they are identical. In another embodiment, the importer 108 determines that the two match when they are approximately similar. For example, the importer 108 can ignore differences such as extra symbols (e.g., space, punctuation, etc.), differences in capitalization, and extra stop words (e.g., "the" and "of"). For example, a name candidate and an entity name may be determined to be similar based on a string similarity measure (e.g., edit distance, Hamming Distance, Levenshtein Distance, Smith-Waterman Distance, Gotoh Distance, Jaro Distance Metric, Dice's Coefficient, Jaccard Coefficient, to name a few). The importer 108 can apply normalization rules to the name candidates and/or the entity names before matching 330 them.

Responding to a match between the name candidates of the selection of documents and the entity names in the white list, the importer 108 determines that the name candidates are valid entity names. If there is no match, the importer 108 determines that the name candidates are not valid entity names. As discussed above, the white list contains valid entity names. Therefore, if name candidates of the selection of documents are valid entity names, it is likely that some of the name candidates match with some of the entity names in the white list. Thus, when there is a match between the name candidates and entity names in the white list, the importer 108 can determine that the name candidates are likely to be valid entity names.

In one embodiment, the importer 108 requires the match to exceed a threshold in order to determine 340 that the name candidates are valid entity names. The threshold can be defined in terms of the number of matches (e.g., at least 3 name candidates match with entity names), the portion of name candidates that match (e.g., at least 5% of the name candidates match with entity names), the portion of entity names in the white list that match, and/or a combination of the above. The threshold can be user-defined or dynamically modified by the importer 108.

In one embodiment, the importer 108 adds the name candidates to the white list after determining 340 that they are valid entity names. The importer 108 may only add those name candidates that do not already exist in the white list. In one embodiment, the importer 108 processes the name candidates before adding them into the white list. For example, the importer 108 can normalize the name candidates before adding them into the white list.

By adding name candidates determined to be valid entity names into the white list, the importer 108 increases the pool of entity names used to determine whether other name candidates are valid entity names. As a result, it is more likely for the importer 108 to find matches between name candidates and entity names in the enlarged white list. Therefore, by adding name candidates into the white list, the importer 108 enhances its ability to recognize entity names.

In some embodiments, instead of selecting 310 a single selection of documents as illustrated in the method 300, the importer 108 selects multiple selections of documents from the plurality of documents, and then processes each of the multiple selections according to the steps described above. The importer 108 may be configured to process one selection of documents before another. For example, the importer 108 can give priority to selections with more documents over selections with fewer documents. Alternatively, the importer 108 can be configured to skip selections with few documents (e.g., selections with no more than 10 documents). In another example, the importer 108 can give priority to documents from reputable sources. The importer 108 may process a selection of documents more than once or process several selections in parallel.

It is noted that titles of the plurality of documents, name candidates, and/or entity names in the white list do not need to be in any specific language. The method 300 may be used to determine entity names in any language.

Example Process

FIGS. 4(*a*) through 4(*c*) illustrate an example process of the method 300 described above with respect to FIG. 3. Initially, as illustrated in FIG. 4(*a*), the plurality of documents comprises seven documents, D1-D7. Document D1 has a title "CNN Programs-Anchors/Reporters-Larry King;" D2 has a title "CNN Programs-Anchors/Reporters-Jennifer Westhoven;" D3 has a title "CNN Programs-Anchors/Reporters-Bob Van Dillen;" D4 has a title "SI.com-Tiger Woods Player Page;" D5 has a title "SI.com-Jim Furyk Player Page;" D6 has a title "CNN.com-Contact Us;" and D7 has a title "CNN.com-Email Newsletters."

The importer 108 selects 310 a selection of documents including documents D1-D3. These documents share a common pattern "% CNN Programs-Anchors/Reporters-% && %%." The common suffix section is empty because the titles of documents D1-D3 do not share a common suffix. It is noted that documents D1-D3, D6, and D7 share a common prefix "CNN." However, because the common prefix of documents D1-D3 is "CNN Programs-Anchors/Reporters-," longer than the common prefix shared by titles of documents D1-D3, D6, and D7 ("CNN"), the importer 108 does not select 310 documents D5 and D6.

The importer 108 determines 320 name candidates of documents D1-D3 by applying the common pattern to their titles. Applying the common pattern ("% CNN Programs-Anchors/Reporters-% && %%") to the title of document D1 ("CNN Programs-Anchors/Reporters-Larry King"), the importer 108 identifies the content of the body section ("Larry King") and determines 320 the name candidate of D1 to be "Larry King." Similarly, the importer 108 determines 320 the name candidate of D2 to be "Jennifer Westhoven" and the name candidate of D3 to be "Bob Van Dillen," as illustrated in FIG. 4(a).

The importer 108 matches 330 the name candidates for the selection of documents D1-D3 with entity names in a white list. As illustrated in FIG. 4(b), the white list comprises five entries, N1-N5. Entry N1 has an entity name "United States;" N2 has an entity name "Jennifer Westhoven;" N3 has an entity name "Tiger Woods;" N4 has an entity name "Google Inc;" and N5 has an entity name "Larry King." The importer 108 determines that entity name N5 matches the name candidate of document D1, and entity name N2 matches the name candidate of document D2. No entity name in the white list matches the name candidate of document D3 ("Bob Van Dillen").

The importer 108 determines that there are matches between the name candidates of documents D1-D3 and the entity names in the white list. Therefore, the importer 108 determines 340 that the name candidates are valid entity names and adds them into the white list. As illustrated in FIG. 4(c), the name candidate for document D3 ("Bob Van Dillen") is added into the white list as entry N6.

After the importer 108 finishes processing the selection of documents, it can repeat the above steps to process the rest of the plurality of documents. For example, the importer 108 can process the remaining documents D4-D7 as illustrated in FIG. 4(a) by selecting 310 a selection of documents comprising documents D6 and D7 (the common pattern of their titles is "% CNN.com-% && %%"), determining 320 name candidates for D6 ("Contact Us") and D7 ("Email Newsletters"), and matching 330 the name candidates with the entity names in the white list. The importer 108 determines 340 that the name candidates of documents D6 and D7 are not valid entity names because there is no match between them and the entity names in the white list. The importer 108 can repeat the process with the remaining documents D4 and D5, and add the name candidate determined for D5 ("Jim Furyk") into the white list as entry N7, as illustrated in FIG. 4(c).

Alternative Embodiments

In one embodiment, the importer 108 compares the name candidates with contents in a black list in addition to (or instead of) matching 330 the name candidates with entity names in a white list. The black list contains texts that are not valid entity names (e.g., adjectives such as "beautiful," and stop words such as "the"). Therefore, if there are matches between the name candidates and the black list, the importer 108 can determine 340 that the name candidates are not valid entity names.

Embodiments of the methods described above can recognize entity names from any source of documents. Therefore, the methods can generate a collection of entity names that are more complete than entity names available from any single source. The methods can also control the quality of entity names recognized by adjusting the matching threshold.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for recognizing entity names from a plurality of web documents, comprising:
   at a server having one or more processors and memory storing one or more programs executed by the one or more processors,
      identifying a common pattern in titles of the plurality of web documents;
      selecting a selection of documents from the plurality of web documents, a title of each document in the selection sharing the common pattern;
      for each document in the selection, generating an entity name candidate from the title of the document in accordance with the common pattern;
      matching the entity name candidates of the selection of documents with a collection of entity names;
      determining that the entity name candidates of the documents in the selection are valid entity names in accordance with a result of the matching; and
      updating the collection of entity names in accordance with a result of the determining.

2. The method of claim 1, wherein selecting the selection of documents from the plurality of web documents further comprises:
   selecting the selection of documents from the plurality of web documents, each document in the selection being from a same domain.

3. The method of claim 1, wherein the common pattern comprises a prefix section, a body section, and a suffix section.

4. The method of claim 3, wherein generating the entity name candidate by applying the common pattern to the title of the document further comprises:
   generating the entity name candidate by removing the prefix section and the suffix section of the common pattern from the title of the document.

5. The method of claim 1, wherein matching the entity name candidates of the selection of documents with the collection of entity names further comprises determining whether at least one of the following conditions is satisfied:
   a number of the entity name candidates matching the entity names in the collection exceeds a threshold;
   a number of the entity names in the collection matching the entity name candidates exceeds a threshold; and
   a portion of the entity name candidates matching with entity names in the collection exceeds a threshold.

6. The method of claim 1, wherein an entity name candidate and an entity name in the collection of entity names are considered matched when they are identical.

7. The method of claim 1, wherein an entity name candidate and an entity name in the collection of entity names are considered matched when their edit distance is smaller than a threshold.

8. The method of claim 1, wherein updating the collection of entity names comprises adding the entity name candidates of the documents in the selection to the collection of entity names in accordance with the result of the matching.

9. The method of claim 1, further comprising:
   matching the entity name candidates of the selection of documents with a collection of texts; and
   determining that the entity name candidates of the documents in the selection are invalid entity names in accordance with the result of the matching.

10. The method of claim 1, wherein generating the entity name candidate from the title of the document includes normalizing the titles of the documents in the selection to generate normalized titles.

11. The method of claim 1, wherein matching the entity name candidates of the selection of documents with the collection of entity names includes normalizing the entity name candidates of the selection of documents to generate normalized entity name candidates.

12. A method for recognizing entity names from a plurality of web documents, comprising:
   at a server having one or more processors and memory storing one or more programs executed by the one or more processors,
      (a) identifying common patterns in titles of the plurality of web documents;
      (b) selecting multiple selections of documents from the plurality of web documents, titles of documents in each selection sharing a respective common pattern associated with the selection of documents;
      (c) for each of the multiple selections of documents, generating a selection of entity name candidates by applying the respective common pattern to the titles of the documents in the selection of documents; and
      (d) in response to matching a collection of entity names and a selection of entity name candidates, performing steps comprising:
         (i) determining that the selection of name candidates are valid entity names,
         (ii) updating the collection of entity names in accordance with a result of the determining,
         (iii) removing a selection of documents associated with the selection of entity name candidates from the multiple selections of documents, and
         (iv) repeating step (d).

13. A system for recognizing entity names from a plurality of web documents, the system comprising:

a processor for executing computer program code; and a subsystem executable by the processor, the subsystem including computer program code for performing a method comprising:

identifying a common pattern in titles of the plurality of web documents;

selecting a selection of documents from the plurality of web documents, a title of each document in the selection sharing the common pattern;

for each document in the selection, generating an entity name candidate from the title of the document in accordance with the common pattern;

matching the entity name candidates of the selection of documents with a collection of entity names;

determining that the name candidates of the documents in the selection are valid entity names in accordance with a result of the matching; and updating the collection of entity names in accordance with a result of the determining.

14. The system of claim 13, wherein selecting the selection of documents from the plurality of web documents further comprises:

selecting the selection of documents from the plurality of web documents, each document in the selection being from a same domain.

15. The system of claim 13, wherein:

the common pattern comprises a prefix section, a body section, and a suffix section;

generating the entity name candidate from the title of the document further comprises generating the entity name candidate by removing the prefix section and the suffix section of the common pattern from the title of the document.

16. The system of claim 13, wherein updating the collection of entity names comprises adding the entity name candidates of the documents in the selection to the collection of entity names in accordance with the result of the matching.

17. A computer readable storage medium storing one or more programs for execution by one or more processors of a computer system, the one or more programs including:

instructions for identifying a common pattern in titles of a plurality of web documents;

instructions for selecting a selection of documents from the plurality of web documents, a title of each document in the selection sharing the common pattern;

instructions for generating an entity name candidate for each document in the selection from the title of the document in accordance with the common pattern;

instructions for matching the entity name candidates of the selection of documents with a collection of entity names;

instructions for determining that the name candidates of the documents in the selection are valid entity names in accordance with a result of the matching; and instructions for updating the collection of entity names in accordance with a result of the determining.

18. The computer readable storage medium of claim 17, wherein the instructions for selecting the selection of documents from the plurality of web documents further comprise:

instructions for selecting the selection of documents from the plurality of web documents, each document in the selection being from a same domain.

19. The computer readable storage medium of claim 17, wherein:

the common pattern comprises a prefix section, a body section, and a suffix section; and the instructions for generating the entity name candidate for each document in the selection from the title of the document further comprises instructions for generating the entity name candidate by removing the prefix section and the suffix section of the common pattern from the title of the document.

20. The computer program product of claim 17, wherein the instructions for updating the collection of entity names includes instructions for adding the entity name candidates of the documents in the selection to the collection of entity names in accordance with the result of the matching.

* * * * *